US006706389B1

(12) United States Patent  (10) Patent No.: US 6,706,389 B1
Bates et al.  (45) Date of Patent: Mar. 16, 2004

(54) FOG-RESISTANT PACKAGING FILM

(75) Inventors: Monty Bates, Victor, NY (US); Narender P. Luthra, deceased, late of Simpsonville, NY (US), by Pam Luthra, personal representative; Mark Davis, Fairport, NY (US); Woodrow W. Pressley, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/446,445

(22) PCT Filed: Jun. 30, 1998

(86) PCT No.: PCT/US98/13407

§ 371 (c)(1),
(2), (4) Date: Jun. 12, 2000

(87) PCT Pub. No.: WO99/00250

PCT Pub. Date: Jan. 7, 1999

Related U.S. Application Data

(60) Provisional application No. 60/051,242, filed on Jun. 30, 1997.

(51) Int. Cl.[7] .................................................. C09J 7/02
(52) U.S. Cl. ........................ 428/349; 428/515; 428/516; 428/520
(58) Field of Search ................................ 428/35.7, 515, 428/516, 520, 346, 349

(56) References Cited

U.S. PATENT DOCUMENTS

| | | | | |
|---|---|---|---|---|
| 3,048,266 A | | 8/1962 | Hackhel | 206/45.34 |
| 3,933,407 A | | 1/1976 | Tu et al. | 350/61 |
| 3,950,289 A | | 4/1976 | D'Amato et al. | 260/23 XA |
| 4,325,850 A | * | 4/1982 | Mueller | 524/228 |
| 4,341,825 A | * | 7/1982 | Kemski | 428/35 |
| 4,490,323 A | | 12/1984 | Thomson | 264/211 |
| 4,595,625 A | * | 6/1986 | Crass et al. | 428/215 |
| 4,785,042 A | * | 11/1988 | Azuma et al. | 524/210 |
| 4,828,892 A | * | 5/1989 | Kersten et al. | 428/35.2 |
| 4,876,146 A | | 10/1989 | Isaka et al. | 428/349 |
| 4,952,451 A | | 8/1990 | Mueller | 428/218 |
| 5,110,677 A | * | 5/1992 | Barmore et al. | 428/349 |
| 5,112,674 A | | 5/1992 | German et al. | 428/216 |
| 5,451,460 A | | 9/1995 | Lu et al. | 428/349 |
| 5,453,260 A | * | 9/1995 | Nakazawa et al. | 423/327.1 |
| 5,529,833 A | | 6/1996 | Speer et al. | 428/215 |
| 5,567,533 A | | 10/1996 | Toney et al. | 428/473.5 |
| 5,688,449 A | | 11/1997 | Fox | 264/54 |
| 5,783,270 A | * | 7/1998 | Fischer et al. | 428/35.2 |

FOREIGN PATENT DOCUMENTS

| | | |
|---|---|---|
| EP | 0 801 096 A1 | 10/1997 |
| EP | 0 826 491 A2 | 3/1998 |
| JP | 55 097953 A | 7/1980 |
| JP | 60 101 043 | 6/1985 |
| JP | 61 195143 A | 8/1986 |
| JP | 12 99830 A | 12/1989 |
| JP | 52 87097 A | 11/1993 |
| WO | 95/18845 | 7/1995 |

* cited by examiner

*Primary Examiner*—Sandra M. Nolan
(74) *Attorney, Agent, or Firm*—Daniel B. Ruble

(57) ABSTRACT

A packaging film includes a heat sealable layer coated with one or more antifogging agents disposed in a binder, an antiblocking agent, and no more than about 800 ppm slip agent. The heat sealable layer includes a polymer that includes mer units derived from ethylene while the binder includes a polymer that includes mer units derived from an ester of (meth)acrylic acid and/or vinyl acetate monomers. The antiblocking agent can be in any layer of the film where it provides the desired effect. Such a film, as well as packages made therefrom, can be used to package a variety of products, having particular utility with respect to moist products.

32 Claims, No Drawings

FOG-RESISTANT PACKAGING FILM

This application is the National Stage (35 U.S.C. §371) of International Application No. PCT/US98/13407 filed Jun. 30, 1998, which claims the benefit of U.S. Provisional Application No. 60/051,242 filed Jun. 30, 1997.

BACKGROUND INFORMATION

1. Field of the Invention

The film described herein is useful in the packaging of a variety products, particularly perishable food products such as whole and cut produce, and exhibits excellent resistance to fogging.

2. Background of the Invention

Each year, thermoplastic packaging materials are used to enclose and protect an increasing number of products. Many of those products exhibit properties that call for packaging materials with special properties. Accordingly, numerous packaging materials are developed and introduced each year.

Because of their flexibility, strength, low weight, etc., thermoplastic films and packages made therefrom continue to capture an ever-increasing percentage of the packaging market. Nevertheless, because of the varied nature of the products being packaged, films with new and improved properties continually are in demand.

Products that contain moisture have presented a long-standing problem. Once such a product is packaged, water evaporating therefrom tends to condense on the inner surface of the package. This is particularly true where the packaged product is stored at subambient temperatures as is the case with, for example, produce.

As one might expect, manufacturers and retailers insist that products be displayed in a manner that is aesthetically pleasing and provides the customer with a clear view of the product. However, condensation reduces the ability of potential customers to see the product. Thus, a need for films and packages that resist this condensation (sometimes called "fogging") has developed. Over the past several years, numerous solutions have been proposed. However, many such solutions have caused other problems.

The surfactants and wetting agents (often referred to as antifogging agents) commonly used to reduce the amount of condensation exhibited in thermoplastic films and packages tend to interfere with the ability of ink to adhere to the polymer(s) of the film or package. Because a significant portion of packages are printed to indicate source, contents, etc., particularly those designed for retail sale, good ink adhesion is a prerequisite.

Although antifoggng agents normally are applied to the surface of the film or package nearest to the food product they tend to migrate into the interior of the film or package. Where this migration continues to the outer surface of the film or package, the antifogging agent (which normally has a low surface tension) can interfere with adhesion between the ink and the film. This lowered adhesion can result in increased difficulty in printing the film and/or smearing of the printed ink onto other articles or consumers.

To exacerbate this film-to-ink adhesion problem, additives called slip agents often are used in film manufacturing processes. Slip agents are internal lubricants that exude to the surface of a film during and immediately after its manufacture so as to provide a thin coating that reduces the coefficient of friction (COF) that the film would otherwise possess. In addition to those slip agents used in the manufacture of the polymeric raw materials, film producers often add even more slip agents (such as fatty amides) during manufacture of the film itself. Although a film with a lower COF can be processed more easily, that same film is more difficult to print and, when printed, has lower film-to-ink adhesion than a similar film containing no slip agent.

Thus, a need remains for a film that has (1) good adhesion to ink, (2) a sufficiently low COF to be manufactured and processed easily, and (3) adequate resistance to fogging. Provision of such a film is highly desirable.

SUMMARY OF THE INVENTION

Briefly, the present invention provides a packaging film that includes a heat sealable layer coated with one or more antifogging agents disposed in a binder, an antiblocking agent, and no more than about 800 parts per million (ppm) slip agent. The heat sealable layer includes a polymer that includes mer units derived from ethylene while the binder includes a polymer that includes mer units derived from an ester of (meth)acrylic acid and/or vinyl acetate monomers. The antiblocking agent can be in any layer of the film where it provides the desired effect. The film preferably includes slip agent in an amount of no more than, in ascending order of preference, about 750 ppm, about 700 ppm, about 650 ppm, about 600 ppm, and about 550 ppm. In certain situations, the amount of slip agent present can be as low as about 500 ppm, about 400 ppm, about 300 ppm, about 200 ppm, about 100 ppm, about 50 ppm, even about 25 ppm. In one embodiment, the film of the present invention can be essentially free of slip agent.

The film of the present invention can be a single layer film, i.e., the heat sealable layer is the only layer. Alternatively, the film of the present invention can be a multilayer film and, for certain end use applications, a film with more than one layer can be preferred. Layers that include a polymer with mer units derived from propylene and/or styrene can provide films with performance characteristics that differ from those of a single layer film.

In other aspects, the present invention provides a package made from the above-described film as well as a method of using the above-described film that includes introducing a product into a pouch made from the film and then sealing the pouch so as to form a package.

Films such as those just described exhibit a desirable COF and resist fogging, even when used to package moist products. Because the film of the present invention includes less slip agent than normally is present in films used for similar applications, it also can exhibit excellent adhesion any ink printed thereon.

The film of the present invention can be used to package a variety of products. It can be especially useful in packaging food products, particularly moist food products such as, for example, many types of produce. The film of the present invention can be especially useful in the packaging of cut lettuce, salad mixes, cut fruit, celery, and the like.

The following definitions apply hereinthroughout unless a contrary intention is expressly indicated:

"(meth)acrylic acid" includes both acrylic acid and/or methacrylic acid;

"polymer" means the product of a polymerization reaction, and is inclusive of homopolymers, copolymers, terpolymers, tetrapolymers, etc.;

"copolymer" means a polymer formed by the polymerization reaction of at two different monomers and is inclusive of random copolymers, block copolymers, graft copolymers, etc.;

"interpolymer" means a polymer formed by the polymerization reaction of two or more different monomers and is inclusive of copolymers, terpolymers, tetrapolymers, etc.;

"ionomer" means a metal salt of an ethylene/(meth) acrylic acid copolymer,

"differing", when used to describe the relative nature of two or more polymers, means differences in any one or more chemical or physical attributes including, but not limited to, identity and/or relative amounts of monomers, relative distribution of mer units, molecular weight, molecular weight distribution, melt flow, and density;

"package" means one or more packaging materials (e.g., a film) configured around a product;

"film" is used in its most generic sense to include all plastic web materials, although those having a thickness of 0.25 mm or less are most preferred;

"inner layer" means a layer of a multilayer film having both of its principal surfaces directly adhered to other layers of the film, "outer layer" means a layer of a film having one (or, in the case of monolayer films, none) its principal surfaces directly adhered to another layer of the film;

"inside layer" means an outer layer of a multilayer film which is, relative to the other layers of the film, closest to the product being packaged;

"outside layer" means that layer of a multilayer film which is, relative to the other layers of the film, farthest from the product being packaged, "between", when used in conjunction with a subject layer and two or more object layers, means both direct adherence of the subject layer to the object layers sandwiching it as well as a lack of direct adherence to either or both of the object layers sandwiching it, i.e., one or more additional layers can be imposed between the subject layer and one or more of the object layers;

"seal" means a bonding of a first region of a film surface to a second region of a film surface created by heating (e.g., by means of a heated bar, hot air, infrared radiation, ultrasonic sealing, etc.) the regions to at least their respective seal initiation temperatures;

"barrier", when used in conjunction with films and/or film layers, means an ability to exclude one or more gases (e.g., oxygen);

"core layer" means an inner layer with a primary function other than serving as an adhesive or compatibilizing agent for adhering two other layers to one another (e.g., providing a desired level of strength or modulus);

"abuse layer" means a layer, normally an outer layer, that is resistant to abrasion, puncture, and other potential causes of reduction of package integrity, as well as potential causes of reduction of package appearance quality;

"tie layer" means an inner layer having the primary purpose of providing interlayer adhesion to adjacent layers that otherwise do not adhere to one another;

"bulk layer" means any layer which has the purpose of increasing the abuse resistance, toughness, modulus, etc., of a multilayer film and generally comprises polymers that are inexpensive relative to other polymers in the film which provide some specific purpose unrelated to abuse resistance, modulus, etc.;

"carrier layer" means a layer which contains one or more adjuvants;

"lamination" and "laminate" (or "laminated film") mean the process, and resulting product, of the bonding of two or more film layers or other materials and includes coextrusion as well as adhesive bonding;

"adhere" means,
(a) when used in connection with two or more films, to bond the films to one another using a heat seal or other means such as, for example, a layer of adhesive between the films, or
(b) when used in connection with film layers, to bond a subject film layer to an object film layer, without a tie layer, adhesive, or other layer therebetween;

"melt index," as described in ASTM D 1238 is the amount of a thermoplastic resin that can be forced through an orifice with a diameter of 0.21 cm (0.0825 inch) when subjected to a force of 2160 grams in ten minutes at a specified temperature (e.g., 190° C.);

"total free shrink" means the percent dimensional change in a 10 cm×10 cm specimen of film, when shrunk at 85° C., with the quantitative determination being carried out according to ASTM D 2732, as set forth in the 1990 *Annual Book of ASTM Standards*, vol. 08.02, 368–371, the entire disclosure of which is incorporated herein by reference;

"longitudinal direction" means along the length of a film, i.e., in the direction of the film as it is formed during extrusion and/or coating, and "transverse direction" means across a film, i.e., the direction that is perpendicular to the longitudinal direction.

DETAILED DESCRIPTION OF ILLUSTRATIVE EMBODIMENTS

The film of the present invention includes a heat sealable layer and a layer that includes an antiblocking agent (i.e., a carrier layer). In one embodiment, the heat sealable layer and the carrier layer are the same layer.

The heat sealable layer of the film of the present invention includes one or more polymers having mer units derived from ethylene. Although ethylene homopolymer can be used, interpolymers are preferred. Exemplary interpolymers include those that include mer units derived from one or more of propylene, $C_4$–$C_{20}$ α-olefins, vinyl acetate, (meth) acrylic acid, and $C_1$–$C_{20}$ esters of (meth)acrylic acid. Ionomers also can be useful. Preferred interpolymers are ethylene/α-olefin interpolymers. For some applications, polyamides and/or polyesters can be used in the heat sealable layer.

The relatively recent advent of single site catalysts, often referred to as metallocenes, necessitates further definitional clarification with respect to ethylene polymers. Heterogeneous polymers have relatively wide variation in molecular weight and composition distribution. Polymers prepared with, for example, conventional Ziegler-Natta catalysts are heterogeneous. On the other hand, homogeneous polymers have relatively narrow molecular weight and composition distributions. Homogeneous polymers exhibit a relatively even sequencing of comonomers within a chain, a mirroring of sequence distribution in all chains, and a similarity of chain lengths, i.e., a narrower molecular weight distribution. Homogeneous polymers typically are prepared using metallocene or other single site catalysts. Both heterogeneous and homogeneous polymers can be used in a variety of layers of the film of the present invention, including the heat sealable layer.

Ethylene/α-olefin interpolymers include both heterogeneous materials such as low density polyethylene (LDPE), medium density polyethylene (MDPE), linear low density polyethylene (LLDPE), and very low and ultra low density polyethylene (VLDPE and ULDPE), as well as to homogeneous materials. Preferably, the α-olefin is a $C_4$–$C_{20}$ α-olefin, more preferably, a $C_4$–$C_{12}$ α-olefin, still more preferably, a $C_4$–$C_8$ α-olefin. Particularly preferred α-olefins include 1-butene, 1-hexene, 1-octene, and mixtures thereof In general from about 80 to 99 weight percent ethylene and from 1 to 20 weight percent α-olefin, preferably from about 85 to 95 weight percent ethylene and from 5 to 15 weight percent α-olefin, are allowed to polymerize in the presence of a single site catalyst. Examples of commercially available homogeneous materials include the metallocene catalyzed Exact™ resins (Exxon Chemical Co.; Baytown, Tex.), substantially linear Affinity™ and Engage™ resins (Dow Chemical Co.; Midland, Mich.), Tafmer™ linear resins (Mitsui Petrochemical Corp.; Japan), and certain resins from Phillips Petroleum Corp. (Bartlesville, Okla.).

Homogeneous ethylene/α-olefin interpolymers can be characterized by several recognized methods. Examples of such methods include a) Molecular weight distribution ($M_w/M_n$): Also known as polydispersity, molecular weight distribution can be determined by, for example, gel permeation chromatography. Homogeneous ethylene/α-olefin interpolymers to be used in a layer of the film of the present invention preferably have a molecular weight distribution of less than 2.7, more preferably from about 1.9 to 2.5, and most preferably from about 1.9 to 2.3.

b) Composition distribution breadth index (CDBI). Homogeneous ethylene/α-olefin interpolymers generally have a CDBI greater than about 70%. CDBI is defined as the weight percent of polymer molecules having a monomer content within 50% (i.e., 50%) of the median total molar monomer content. CDBI can be determined by temperature rising elution fractionation as described by, for example, Wild et. al., *J. Poly. Sci.—Poly. Phys. Ed.*, vol. 20, 441 (1982). Linear polyethylene, which does not contain a comonomer, is defined to have a CDBI of 100%. CDBI determination clearly distinguishes homogeneous interpolymers (CDBI values generally above 70%) from presently available VLDPEs (CDBI values generally less than 55%).

c) Melting point: Homogeneous ethylene/□-olefin interpolymers typically exhibit an essentially single melting point with a peak melting point ($T_m$), as determined by differential scanning calorimetry (DSC), of from about 60° to 105° C., more precisely a DSC peak $T_m$ of from about 80° to 100° C. As used herein, this means that at least about 80% (by weight) of the material corresponds to a single $T_m$ at a temperature within the range of from about 60° C. to 105° C., and essentially no substantial fraction of the material has a peak melting point in excess of about 115° C. as determined by DSC analysis (e.g., on a Perkin Elmer™ System 7 Thermal Analysis System). The presence of higher melting peaks has been found to be detrimental to film properties such as haze and seal initiation temperature.

The heat sealable layer polymer(s) containing mer units derived from ethylene preferably include a homogeneous ethylene/α-olefin interpolymer having a density of from about 0.85 to about 0.915 g/cm³, more preferably from about 0.88 to about 0.912 g/cm³, and most preferably from about 0.902 to about 0.908 g/cm³. The ethylene/α-olefin interpolymer also preferably has a melting point of from about 65° to about 110° C., more preferably from about 85° to 110° C., and most preferably from about 95° to about 105° C. Of course, one or more polymers with higher densities also can be included in the heat sealable layer.

Homogeneous ethylene/α-olefin interpolymers inherently are more tacky, less dense, etc., than corresponding heterogeneous ethylene/α-olefin interpolymers. Because of these characteristics, they generally require the presence of more antiblocking agent than do corresponding heterogeneous ethylene/α-olefin interpolymers to have the same degree of processability. However, as shown infra, the film of the present invention need not contain a large amount of antiblocking agent to be easily processable.

In general, where the film of the present invention has more than one layer, the heat sealable layer can have a thickness of from about 1 to about 75 μm, preferably from about 2.5 to about 50 μm, more preferably from about 5 to about 40 μm, even more preferably from about 7 to about 25 μm, and most preferably from about 10 to about 20 μm.

Although the packaging film of the present invention can have just a single layer (i.e., a heat sealable layer as described above), at least one other layer can be preferred for some end use applications. Where a multilayer film is desired, the film can have any number of layers and any total thickness as long as it provides the desired properties for the particular packaging operation in which it is to be used (e.g., barrier properties, free shrink, shrink tension, optics, modulus, seal strength, etc.). Preferably, the film has no more than about 20 layers, more preferably no more than about 12 layers, most preferably no more than about 7 layers.

Thermoplastic films are employed in a variety of food and non-food packaging applications. The physical properties required of a film for any given end use application often determine the composition of the film and/or the compositions of the various layers of the film. Where a variety of properties are required, a variety of layers containing differing polymeric components can be, and usually are, employed. Those of ordinary skill in the art are aware of the many types of polymers that can be used in the layer(s) other than the seal layer. Examples of such polymers include ethylene homopolymer, propylene homopolymer, ethylene/α-olefin interpolymers, propylene/ethylene interpolymers, ethylene/unsaturated ester interpolymers, styrene homopolymer, styrene interpolymers, and ethylene/cycloolefin interpolymers. Often, blends of these and/or other polymers are used to optimize the properties provided by a single layer or to provide a single layer with multiple properties.

For example, where gas barrier properties are desired, a layer including, for example, ethylene/vinyl alcohol interpolymer (EVOH), vinylidene chloride interpolymer, or one or more of certain polyamides can be included in the multilayer film structure. Certain barrier materials, such as for example EVOH, are known to be sensitive to moisture. Where a film containing such a barrier layer is to be exposed to moisture, then one or more moisture barrier layers also can be included. If the film is likely to be subjected to abuse during handling and/or transport, an abuse layer can be provided (either as an inner or outer layer). One or two sealable layers can be provided to allow for sealing of the film to itself or another packaging article during the formation of a package. One or more core layers also can be provided, and films with at least one core layer are preferred for many applications.

Especially when packaging oxygen-sensitive products (i.e., products which exhibit lower shelf life in the presence of either too much or too little oxygen in the package such as, for example, vegetables, fruits, and cheese), providing a film which adequately transmits oxygen (and sometimes carbon dioxide) is an important concern. For example, in the packaging of precut lettuce, the presence of too much oxygen results in enzymatic browning of cut surfaces, known as pink ribbing. On the other hand, if the concentration of oxygen is too low, the lettuce tends to spoil due to anaerobiosis. Accordingly, where the product to be packaged is oxygen sensitive, care must be taken to ensure that the combination of layers chosen provides the resulting film or package with a sufficiently high oxygen permeance.

Especially when used for packaging products such as, e.g., produce, the film of the present invention preferably has an oxygen permeance, at standard temperature and pressure (STP), of from about 0.006 to about 0.6 $cm^3/m^2 \cdot s$, more preferably from about 0.009 to about 0.25 $cm^3/m^2 \cdot s$, even more preferably from about 0.01 to about 0.12 $cm^3/m^2 \cdot s$, and most preferably from about 0.02 to about 0.09 $cm^3/m^2 \cdot s$. A film with an oxygen permeance in one of the foregoing ranges can be used in many produce packaging applications. For other packaging applications, lower oxygen permeances might be preferred.

Many polymers that include mer units derived from propylene or styrene can be used to provide film layers with high oxygen permeances. Examples of polymers containing mer units derived from propylene include propylene homopolymer (particularly polypropylene that has been oriented) and ethylene/propylene copolymer; of the foregoing, oriented polypropylene and ethylene/propylene copolymer are preferred. Preferred among the ethvlene/propylene copolymers are those containing from about 0.1 to 6 weight percent mer units derived from ethylene. Examples of polymers containing mer units derived from styrene include styrene homopolymer and styrene/butadiene interpolymers; of these, styrene/butadiene copolymers are preferred. Where such polymers are present in a given layer, they preferably comprise at least about 50% (by wt.), more preferably at least about 75% (by wt.), of that layer.

In general, any core layer(s) present can have a thickness of from about 2.5 to about 150 μm, preferably from about 5 to about 100 μm, more preferably from about 6 to about 60 μm, even more preferably from about 7.5 to about 25 μm, and most preferably from about 10 to about 20 μm.

Where the film of the present invention includes more than one layer, especially where it is to be used for applications such as packaging produce, it preferably has one of the following structures A/B, A/B/A, or A/B/C/B/A. In the foregoing structures, A represents a layer that includes a polymer that contains mer units derived from ethylene while B and C represent layers that include at least one polymer containing mer units derived from propylene or styrene. Additionally, a film having any of the foregoing structures can be laminated to another monolayer or multilayer film having any desired structure. Such lamination can be by the application of adhesive or by corona lamination, both of which are well known in the art.

Examples of preferred multilayer film structures are A/B structures such as those described in U.S. Pat. No. 5,523,136 (Fischer et al.), A/B/A structures such as those described in U.S. Pat. No. 5,491,019 (Kuo), and A/B/A and A/B/C/B/A structures such as those described in PCT publication WO 97/28964. The disclosures of each of the foregoing documents are incorporated herein by reference.

The film of the present invention preferably has a total thickness of from about 12.5 to about 250 μm, more preferably from about 15 to about 125 μm, even more preferably from about 20 to about 75 μm, and most preferably from about 25 to about 50 μm.

Where the film of the present invention includes three or more layers, at least one inner layer preferably has a Young's modulus higher than that of the heat sealable layer. The film of the present invention preferably has an overall Young's modulus of at least about 275 to about 1400 MPa, more preferably from about 350 to about 1025 MPa, even more preferably from about 500 to about 875 MPa, and most preferably from about 550 to about 775 MPa.

Regardless of the number of layers present in the film of the present invention, at least one of the layers includes antiblocking agent dispersed therethroughout. Antiblocking agents generally are recognized as finely divided, infusible solids that, when incorporated into a film, provide asperities that protrude from one or both of the primary surfaces of the film. The air spaces resulting from these asperities are believed to interfere with the surface(s) of the film adhering to each other. Also, antiblocking agents offer a beneficial "roller bearing" effect when the film is run across metal parts in typical commercial packaging equipment such as, for example, a DOBOY™ horizontal form-fill-seal machine (Doboy Packaging Division of SIG Pack Inc.; New Richmond, Wis.) or vertical form-fill-seal (VFFS) machines.

The generally accepted view has been that antiblocking agents need to be incorporated into an outer layer to be provide the aforementioned asperities. However, recent work has shown that relatively large particles used for antiblocking purposes can be incorporated into an interior layer of a film and still be beneficial. See, e.g., EP-A-0 826 491 (which corresponds to co-pending U.S. patent application Ser. No. 08/706,993, the disclosure of which is incorporated herein by reference). Nevertheless, incorporation of antiblocking agent into an outer layer can be preferred in certain embodiments of the film of the present invention.

Antiblocking agents useful in the film of the present invention can include mineral-based and/or synthetic inorganic materials. Mineral-based antiblocking agents include both those that are silica-based (e.g., diatomaceous earth, aluminum silicates, silicon dioxide, quartz, glass, and silica sand), as well as others such as kaolin, talc, feldspar, and calcium carbonate. Synthetic antiblocking agents include gel-type and precipitated-type synthetic silicas. Preferred inorganic antiblocking agents include aluminum silicate (i.e., clay), silica, sodium calcium alurinosilicate, magnesium silicate (talc), and calcium silicate, particularly aluminum silicate, silica, sodium calcium aluminosilicate, and magnesium silicate.

Antiblocking agents useful in the film of the present invention also can include crosslinked or uncrosslinked organic materials. Examples include polyesters, EVOH, polyamide 6, polyamide 66, syndiotactic polystyrene, poly (methyl methacrylate), engineering resins, liquid crystalline polymers, and aramids. Selecting an appropriate organic antiblocking agent depends at least in part on the nature of the layer in which the antiblocking agent is to be included. For example, the Vicat softening point of any organic antiblocking agent used preferably is higher than that of the polymer(s) of the carrier layer.

The foregoing antiblocking agents can have a median particle size (diameter) of from about 0.1 to about 10 μm, more commonly from about 1 to about 8 μm, and preferably from about 2 to about 6 μm. Regardless of identity and size, the antiblocking agent preferably is in the form of approximately spherical particles, although particles of irregular and angular shapes also can be used.

Alkali aluminosilicate ceramic particles are a preferred type of antiblocking agent, particularly those ceramic particles that have a refractive index of about 1.52. (See discussion infra.) Alkali aluminosilicate ceramic particles useful as antiblocking agents in accordance with the present invention are available in a variety of sizes and size distributions. Preferred alkali aluminosilicate ceramic particles are ZEEOSPHERE™ microspheres (Zeelan Industries, Inc.; St. Paul, Minn.). These particular microspheres are believed to be hollow, although that particular characteristic is not believed to be critical to their efficacy.

Antiblocking agent preferably is present in the film of the present invention at a level of from 0.025 to about 6% (by wt.), more preferably from about 0.05 to about 4% (by wt.), and most preferably from about 0.075 to about 2.5% (by wt.), with each of the foregoing percentages being based on the weight of the carrier layer. However, where alkali aluminosilicate ceramic particles are used as the antiblocking agent, they preferably constitute only up to about 0.1% (by wt.) of the carrier layer and no more than about 0.3% (by wt.) of the overall film. (Lower loading levels can be used because of the relatively large size of such particles.) A preferred loading 30 level is from about 0.05 to about 0.75% (by wt.), more preferably from about 0.075 to about 0.5% (by wt.), of the film. Most preferably, where ceramic microspheres are used, they are present in an amount of from about 0.1 to about 0.3% (by wt.).

Additionally, the amount of antiblocking agent included in the carrier layer(s) can depend on the desired COF and haze values for the film and the size of the particles employed. Specifically, where the particles have a mean diameter of up to about 5.5 $\mu$m (such as, for example, ZEEOSPHERE™ W-210 microspheres, which are reported to have a median diameter of about 3.5 $\mu$m), they preferably are present in an amount of at least about 0.05 weight percent. However, where the particles have a mean diameter of more than about 5.5 $\mu$m (such as, for example, ZEEOSPHERE™ W-410 microspheres which are reported to have a median diameter of about 4.5 to about 5.0 $\mu$m), at least about 0.01 weight percent particles can provide the desired balance of COF and haze properties.

Alkali aluminosilicate ceramic particles (i.e., microspheres) can produce a relatively large reduction in the COF of a film into which they are incorporated at relatively low loading levels. Reducing the amount of antiblocking agent used can lessen substantially deleterious build up. In general, build up is accumulation of film additives on one or more surfaces of packaging equipment caused by repeated friction between the surface(s) and the film, particularly when the packaging equipment is being run at high speeds. Build up often presents a significant problem during a packaging operation because it tends to slough off of the equipment surface(s) into and/or onto the packages being formed. At a minimum, this results in unsightly packages, and, in the case of food packages, can result in food law concerns. Film additives that can contribute to build up include a variety of additives but, in particular, antiblocking agents and slip agents. Equipment surfaces can be cleaned often to avoid package failure caused by build up; however, repeated cleaning can result in a significant amount of down time for many packaging operations. Thus, lessening the amount of antiblocking agent and slip agent present in a packaging film while retaining good processability of the overall film is highly desirable.

Certain types of alkali aluminosilicate ceramic particles can appear white to the unaided eye. These particular ceramic particles have a refractive index of about 1.52. Accordingly, in certain preferred embodiments, providing a carrier layer and/or overall film with a refractive index of at least about 1.50, more preferably a refractive index of about 1.50 to about 1.54, most preferably a refractive index of about 1.52 (i.e., as close as possible to the ceramic particles) can be preferred. Polyolefinic materials generally have refractive indices in the range of from about 1.46 to about 1.54 and are, therefore, preferred materials for the various layers of the film. More specifically, interpolymers including mer units derived from ethylene advantageously have refractive indices in the vicinity of those of the aforedescribed ceramic particles. Where the heat sealable layer is also the carrier layer, the refractive index of the heat sealable layer preferably is at least about 1.50, more preferably from about 1.50 to about 1.54. Such similarity in refractive indices between the carrier layer and the antiblocking agent normally results in a film with excellent optical properties (i.e., clarity and haze).

As mentioned previously, the film of the present invention requires a significantly lower amount of slip agent to achieve the same degree of processability as previously available films. In some circumstances, the film of the present of the present can include slip agent in an amount of no more than about 500 ppm, no more than about 400 ppm, no more than about 300 ppm, no more than about 200 ppm, no more than about 100 ppm, no more than about 50 ppm, and even no more than about 25 ppm. In one embodiment, the film of the present invention can be essentially free of slip agent. In no case does the film of the present invention include more than about 800 ppm, preferably no more than about 750 ppm, more preferably no more than about 700 ppm, even more preferably no more than about 650 ppm, still more preferably no more than about 600 ppm, and most preferably no more than about 550 ppm. Where the film of the present invention includes at least three layers, slip agent can be present (if at all) in an inner or an outer layer of the film.

Commonly used slip agents that also can be present in the film of the present invention include fatty amides, waxes, polytetrafluoroethylene, and the like. Where a fatty amide is used as the slip agent, it can be a primary, secondary, or tertiary amide; a fatty alkanolamide; or a fatty bisamide. Preferably, any fatty amide used is selected from erucamide, stearamide, oleamide, behenamide, and ethylene bisstearamide. A more detailed discussion of fatty amides can be found in McKenna, *Fatty Amides*, 1992 (Witco Chemical Corp.) to which the reader is referred for more information on the subject of useful amides.

The film of the present invention also includes an antifogging agent coated on the heat sealable layer. Those of ordinary skill in the art understand that antifogging agents normally are placed on that surface of a package that is closest to the product (i.e., the inside surface). Because of the way that many packages are formed from films, the appropriate surface normally is the heat sealable layer.

Antifogging agents that can be used in conjunction with the film of the present invention generally fall into such broad classes as esters of aliphatic alcohols, polyethers, polyhydric alcohols, esters of polyhydric aliphatic alcohols, and polyethoxylated aromatic alcohols (including phenols). Commonly used antifogging agents include such materials as polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly(oxypropylene), polyethoxylated fatty alcohols, polyoxyethylated 4-nonylphenol, polyhydric alcohol, propylene diol, propylene triol, and ethylene diol. Antifogging agents that are preferred in the film of the present invention include monoglyceride esters of vegetable oil or animal fat, monophenyl polyethoxylate, distilled or undistilled glycidyl monoleate, and sorbitan monolaurate.

Particularly preferred is sorbitan monolaurate, either alone or in combination with one or more of the foregoing.

Rather than being applied directly on the heat sealable layer or being blended into the mixture from which the heat sealable layer is derived, the antifogging agent is entrapped in a binder. More specifically, the antifogging agent is bound in a polymeric material that is applied to the outer surface of the heat sealable layer. Although many types of polymers potentially can be used as the binder, those containing mer units derived from an ester of (meth)acrylic acid or vinyl acetate have been found to be particularly useful. Preferably, the binder includes a polymer containing mer units derived from an ester of acrylic acid and/or a polymer containing mer units derived from ethylene and vinyl acetate (e.g., an ethylene/vinyl acetate copolymer). Polymers containing mer units derived from an ester of acrylic acid are particularly preferred as binders in the film of the present invention. Regardless of the type of polymer(s) in the binder, the polymer(s) preferably include slip agent in an amount of no more than that specified previously.

The relative amounts of antifogging agent to binder can vary greatly and, to an extent, depend on the identity of the antifogging agent and binder chosen. Nevertheless, the ratio of antifogging agent to binder normally can range from about 1:10 to about 10:1, preferably from about 2:3 to about 5:1, and more preferably from about 1:1 to about 2:1.

Although unnecessary to the efficacy of the binder-antifogging agent blend, one or more solvents can be present. In some circumstances, any solvent present has a relatively low boiling point and is relatively non-polar. Examples of preferred solvents include various acetates (e.g., ethyl acetate, n-propyl acetate, and the like) and various alcohols (e.g., ethanol).

Also, although unnecessary to the efficacy of the binder-antifogging agent blend, silica can be included the blend. Blends containing silica can provide antiblocking-like properties to the coating.

The antifogging blend can be applied to the film by any known coating method including, but not limited to flexographic, gravure, plate, and the like. Regardless of how applied to the film of the present invention, a coating of the antifogging blend can have a thickness of from about 0.025 to about 5 $\mu$m, preferably from about 0.1 to about 2.5 $\mu$m, more preferably from about 0.25 to about 1 $\mu$m.

An especially preferred film according to the present invention has antifogging agent present on a first outer surface of the film and printing on the other outer surface thereof. Because the film of the present invention includes a relatively small amount of slip agent and includes antifogging agent that is bound in a polymeric matrix on the opposite side of the film, printed ink normally adheres well to (i.e., does not rub off) the film or a package made therefrom. Also, surface treatment the film at the time of or after manufacture (e.g., by corona, plasma, or similar treatment) can result in a film having enhanced ink adhesion. Preferably, the film of the present invention has an outer surface (i.e., a surface on which printing is to occur) having a surface energy of at least about 0.038 J/m$^2$, more preferably at least about 0.040 J/m$^2$, and most preferably at least about 0.042 J/m$^2$. Generally, printed ink adheres to such films to a level of at least about 80% as measured by a standard pressure sensitive tape test known to those of ordinary skill in the art.

To protect images printed on the outside surface of a film of the present invention, the film can be laminated to another film so that the image is trapped between the two films. Alternatively, the printed film can be protected with a thin polymeric overcoating. Any such overcoating preferably includes a polymer with mer units derived from an ester of (meth)acrylic acid, particularly an ester of acrylic acid. In addition, such an overcoat can include up to about 1 weight percent silica based on the total weight of the overcoat. Silica can help to space the coated layer from the adjacent layer when the film of the present invention is wound.

The film of the present invention in an untreated form (i.e., when not corona treated) preferably displays a kinetic COF when in contact with a metal surface (as measured according to ASTM D 1894–95, incorporated herein by reference), of no more than about 0.50, more preferably no more than about 0.40, even more preferably no more than about 0.35, and most preferably no more than about 0.33. Kinetic COFs in the range of 0.30 to 0.32 can readily be achieved with films according to the present invention.

Depending on the number and type of layers included and the manner in which it is made, the packaging film of the present invention can be used for a wide variety of purposes. The film of the present invention can be manufactured by a variety of processes known in the art. The particular process chosen normally will depend on the ultimate end use for the material. For example, where the material is to be used as a shrink film, various blown bubble manufacturing techniques can be employed. Various film blowing, free film extrusion, extrusion coating processes, etc., can be envisioned by one of ordinary skill of the art.

The film of the present invention can be oriented and, when it is, it preferably is biaxially oriented. Such a film preferably is both biaxially oriented and heat shrinkable. A film that is oriented has been elongated, generally at an elevated temperature (i.e., the orientation temperature), then set or locked in the elongated configuration by cooling. This combination of elongation at elevated temperature followed by cooling causes an alignment of the polymer chains to a more parallel configuration, thereby dramatically altering the mechanical properties of the film. When an unrestrained, unannealed, oriented film subsequently is heated to its orientation temperature, the film shrinks almost to its original, i.e., preelongation, dimensions. Such a film is said to be heat shrinkable.

Often, the term orientation ratio (i.e., the product of the extent to which a film is oriented in several directions, usually two directions perpendicular to one another) is used when describing the degree of orientation of a given film. Orientation in the machine direction is referred to as "drawing", whereas orientation in the transverse direction is referred to as "stretching". For films extruded through an annular die, stretching is obtained by blowing the film to produce a bubble. For such films, drawing is obtained by passing the film through two sets of powered nip rolls, with the downstream set having a higher surface speed than the upstream set. The resulting draw ratio is the surface speed of the downstream set of nip rolls divided by the surface speed of the upstream set of nip rolls.

Where the film of the present invention is biaxially oriented, it can be used to produce bags for packaging fresh red meat, smoked and processed meat, pork, cheese, poultry, and the like, as described in, for example, U.S. Pat. No. 3,741,253 (Brax et al.), U.S. Pat. No. 3,891,008 (D'Entremont), U.S. Pat. No. 4,048,428 (Baird), and U.S. Pat. No. 4,284,458 (Schirmer). Also, it can be used as a shrink film in packaging applications for packaging food and non-food items such as are described in, for example, U.S. Pat. Nos. 4,551,380 and 4,643,943 (both to Schoenberg).

The packaging film of the present invention can have oxygen, moisture, or odor barrier functionality, as described in, for example, U.S. Pat. No. 4,064,296 (Bornstein et al.), U.S. Pat. No. 4,724,185 (Shah), U.S. Pat. No. 4,839,235 (Shah), and U.S. Pat. No. 5,004,647 (Shah). Where a barrier layer is included, the packaging film of the present invention can be used in applications in which the product(s) being packaged preferably is to be protected from one or more detrimental materials (e.g., atmospheric $O_2$). More particularly, the material of the present invention can take the form of stretch film, film suitable for vertical or horizontal form-fill-and-seal end use, lid stock film, film suitable for vacuum skin packaging, film suitable for use as a barrier bag, film suitable for use as a patch bag as disclosed in, for example, U.S. Pat. Nos. 4,755,403 and 4,770,731 (both to Ferguson), film suitable for use in case ready packaging, film suitable for use in a thermoformed container (particularly in a film used as a liner in a thermoformed tray, such as a polystyrene tray), aroma/odor barrier film, film suitable for use in cook-in end use applications (especially heat shrinkable bags, heat shrinkable and non-heat shrinkable casings, and containers thermoformed from non-heat shrinkable films and sheets), and medical film. Those of ordinary skill in the art can envision other packaging applications in which the film of the present invention can be used. These too are within the scope of the present invention.

The film of the present invention can be irradiated to induce crosslinking. In the irradiation process, the film is subjected to an energetic radiation treatment, such as corona discharge (see, e.g., U.S. Pat. Nos. 4,120,716 and 4,879,430), plasma, flame, ultraviolet, X-ray, gamma ray, beta ray, and high energy electron treatment, which induces crosslinking between molecules of the irradiated material. The proper dosage level can be determined by standard dosimetry methods known to those of ordinary skill in the art, and the precise amount of radiation to be used of course depends on the particular structure and its end use. Where the film is irradiated, it preferably is exposed to from about 0.5 to about 15 megarads (MR), more preferably from about 1 to about 12 MR. Further details on the irradiation of polymeric films can be found in, for example, U.S. Pat. No. 4,064,296 (Bornstein et al.).

Gas permeances for produce packaging films have traditionally been tailored to a desired level by varying the overall thickness of the multilayer film. That is, to achieve a desired, relatively high permeance to oxygen, a thinner film is produced. Such downgauging is often done at the expense of film strength and abuse resistance. Conversely, film structures that are abuse resistant and machinable generally lack the desired level of gas permeability and sealing properties required for use with VFFS equipment. However, the film of the present invention combines abuse resistance with a relatively high oxygen permeance.

Furthermore, use of the film of the present invention in VFFS equipment results in a very low percentage of packages having defective seals. The desirable processing characteristics of the multilayer film of the present invention enable greater packaging speeds on VFFS equipment, as well as other packaging machinery. These desirable processing characteristics extend to other packaging operations in which the film is used as lid stock, overwrap, etc. The greater packaging speeds are due to the low seal temperature and high hot tack strength characteristics of the multilayer film of the present invention. In carrying out the packaging, process of the present invention, any VFFS machine used preferably forms, fills, and seals at least 15 packages per minute without substantial burn through of the film at the seals.

VFFS equipment is well known to those of ordinary skill in the packaging art. The following documents disclose a variety of equipment suitable for VFFS packaging: U.S. Pat. Nos. 2,956,383 and 3,340,129 (both to Grevich), U.S. Pat. Nos. 3,611,657 and 3,703,396 (both to Inoue et al.), U.S. Pat. No. 4,103,473 (Bast et al.), U.S. Pat. No. 4,506,494 (Shimoyama et al.), U.S. Pat. No. 4,589,247 (Tsuruta et al.), U.S. Pat. No. 4,532,752 (Taylor), U.S. Pat. No. 4,532,753 (Kovacs), and U.S. Pat. No. 4,571,926 (Scully). The disclosures of each of the foregoing are incorporated herein by reference.

In a VFFS apparatus, a predetermined quantity of the product to be packaged is supplied to the upper end of a forming tube while packages are formed in a lower portion of the same apparatus. Flexible sheet material (i.e., film) is fed from a roll over forming bars, wrapped about a forming tube, and provided with a longitudinal seal by a heat sealing device resulting in the formation of a vertically oriented tube. Another set of seal bars close and seal horizontally across the lower end of the vertically sealed tube to form a pouch into which product is thereafter introduced. Drive belts, powered and directed by rollers, advance the tube and pouch a predetermined distance after which the seal bars close and seal horizontally across the upper end of the pouch (so as to form a closed package) while simultaneously sealing another lower end of the vertically sealed tube above the pouch. Incorporating a knife with the final set of seal bars allows the VFFS apparatus to sever the package from the bottom of the subsequent pouch.

As mentioned previously, the film of the present invention particularly is adapted for use with oxygen sensitive products. Examples of oxygen sensitive products that can be packaged in the film of the present invention include, but are not limited to, head lettuce, leaf lettuce, cabbage, broccoli, green beans, cauliflower, spinach, kale, carrot, onion, and radish. Where the film of the present invention has an oxygen permeance (at STP) of about 0.02 to about 0.12 $cm^3/m^2 \cdot s$, more preferably from about 0.03 to about 0.07 $cm^3/m^2 \cdot s$, the product to be packaged preferably includes at least one of head lettuce, leaf lettuce, cabbage, green beans, kale, carrot, onion, and radish.

Objects and advantages of this invention are further illustrated by the following examples. The particular materials and amounts thereof, as well as other conditions and details, recited in these examples should not be used to unduly limit this invention.

EXAMPLES

Example 1

Manufacture of Film Structures

A. Three-layer Coextruded Film

A coextruded, non-oriented film having an average thickness of about 51 μm was produced on conventional hot blown film equipment equipped with a multilayer annular die to produce a film having an A/B/A-type structure.

The "A" layer was made from a blend containing 71.6% (by wt.) of D139 homogeneous ethylene/hexene copolymer (Phillips Chemical Co.; Houston, Tex.) having a density of 0.918 $g/cm^3$ and a melt flow index (190° C., 2.16 kg) of 0.9; 25.0% (by wt.) 607A LDPE (Dow Chemical Co.; Freeport, Tex.) having a density of 0.924 $g/cm^3$ and a melt flow index of 2.0; 1.4% (by wt.) of SSABC-2575TTD-2 slip agent/antiblock/process aid master batch (Polyfil Corp.; Rockaway, N.J.); and 2.0% (by wt.) of LR-89602 antiblock concentrate (Ampacet Corp.; Tarrytown, N.Y.). This layer was corona treated in-line at the blown extrusion process step so that the layer had a surface energy of about 0.037 to 0.040 $J/m^2$, thus making the surface receptive to solvent-based, surface print ink systems.

The "B" layer was made from PP 9122™ propylene/ethylene random copolymer (Exxon Chemical Co., Baytown, Tex.), having a nominal density of 0.900 g/cm³, a melt flow index (230° C., 2.16 kg) of 2.1, and an ethylene mer content of (nominally) 2.0 weight percent.

The "C" layer was made from a blend including 69.8% (by wt.) of Exact™ SLX-9107 homogeneous ethylene/hexene copolymer (Exxon Chemical Co.) having a density of 0.91 0 g/cm³ and a melt flow index (1 90° C., 2.16 kg) of 1.2, 25.0% (by wt.) of 607A LDPE having a density of 0.924 g/cm³ and a melt flow index of 2.0; 3.2% (by wt.) slip agent/antiblock/process aid master batch; and 2.0% (by wt.) of 10917 antiblock concentrate (Ampacet Corp.).

The blends for the A, B, and C layers were fed into separate extruders. The molten, homogenized layers were coextruded through an annular coextrusion die and blown to a desired width while simultaneously being cooled with both an outer air ring and an internal bubble cooling stack. The cooled multilayer film was collapsed, ply separated, and wound on cores for further processing.

B. Monolayer Film

A monolayer film having an average thickness of about 56 μm was produced by a conventional blown extrusion process. The blend included 72.5% (by wt.) of D139 homogeneous ethylene/hexene copolymer (Phillips Chemical Co.), 25.0% (by wt.) 607A LDPE (Dow Chemical Co.); 1.5% (by wt.) slip agent/antiblock/process aid master batch; and 1.0% (by wt.) of 10917 antiblock concentrate.

The molten, homogenized blend was extruded through an annular blown film extrusion die, and was blown to a desired width while simultaneously being cooled with an outer air ring. Gauge randomization was accomplished with an oscillating die while a conventional covered wood slat frame achieved bubble collapsing. The relatively cool, collapsed tube was then corona treated to a surface energy of about 0.037 to 0 040 J/m², making the surface receptive to solvent-based, surface print ink systems.

The cooled film was ply separated, and wound on cores for further processing. The film exhibited an excellent balance of optics, sealability, toughness, and cost.

C. Laminated Film Including Biaxially Oriented Polypropylene (BOPP)

A 23 μm thick 343 AA22 BOPP film (Amtopp Corp.; Livingston, N.J.) with one treated, printed side was laminated to a 43 μm monolayer blown film similar to that described immediately above. The latter film was made from a blend of 70.75% (by wt.) of Exceed™ 350D60 homogeneous ethylene/hexene copolymer (Exxon Chemical Co.) having a density of 0.917 g/cm³ and a melt flow index (190° C., 2.16 kg) of 1.0, 17.0% (by wt.) of LDPE having a density of 0.924 g/cm³ and a melt flow index of 2.0, 10.0% (by wt.) of Exact™ SLX-9090 homogeneous ethylene/hexene copolymer (Exxon Chemical Co.) having a density of 0.902 g/cm³ and a melt flow index (190° C., 2.16 kg) of 1.2, and 2.25% (by wt.) slip agent/anti-block/process aid master batch.

The two films were laminated using a solventless, two-component adhesive. The adhesive included 1.7 parts Liofol™ 7975 isocyanate component (Liofol Co., Cary, N.C.) and 1.0 part Liofol™ 7276 polyol component (Liofol Co.). The adhesive was applied to the printed BOPP surface by means of an applicator roll at a coating weight of 1.8 to 2.2 kg per ream. The other film was brought into contact with the adhesive-coated BOPP surface at a nip roll. The laminate was wound into master rolls and allowed to cure 24 to 48 hours prior to slitting into roll stock width.

D. Laminated Film Including Two-layer Coextruded Film

A two-layer coextruded film was prepared from two different blends. The 18.5 μm thick first layer was made from a blend containing 98% (by wt.) Styrolux™ 684D-Q188 styrene/butadiene copolymer (BASF; Mount Olive, N.J.) and 2.0% (by wt.) of SKRH-10 slip concentrate (A. Schulman Co.; Akron, Ohio). The 8.2 μm second layer was made from a blend of 84.5% (by wt.) of Exact™ 3125 homogeneous ethylene/butene copolymer (Exxon Chemical Co.) having a density of 0.910 g/cm³ and a melt flow index of 1.2, 10.0% (by wt.) LDPE having a density of 0.924 g/cm³ and a melt flow index of 2.0, 3.5% (by wt.) slip agent/antiblock/process aid master batch, and 2.0% (by wt.) of a polymer process aid master batch (Ampacet Corp.). The outer surface of the second layer was corona treated in-line at the blown coextrusion process step so that the layer had a surface energy of about 0.040 to 0.044 J/m², thus making the surface receptive to solvent based, reverse print ink systems. The film was subsequently reverse printed flexographically on the treated surface.

The printed, coextruded film then was adhesively laminated to a 51 μm thick monolayer film made from a blend of 77% (by wt.) of Exceed™ 350D60 homogeneous ethylene/hexene copolymer having a density of 0.910 g/cm³ and a melt flow index of 1.2, 20.0% (by wt.) LDPE having a density of 0.924 g/cm³ and a melt flow index of 2.0, 2.25% (by wt.) slip agent/antiblock/process aid master batch, and 0.75% (by wt.) of 10917 antiblock concentrate.

The two films were laminated and processed as described supra.

Example 2

Physical Properties of Films

The four films from Example 1 were tested in various ways. The results of those tests are given in the table immediately below.

TABLE 1

| | A | B | C | D |
|---|---|---|---|---|
| Thickness of layer(s), μm | 13/25/13 | 56 | 23//2.5//43 | 27//2.5//51 |
| Oxygen permeance (at 23° C. and 101 kPa), cm³/m².s | 0.032 | 0.039 | 0.014 | 0.028 |
| Peak hot tack, g | 800 | 825 | 1500 | 475 |
| Seal initiation temp., ° C. | 190 | 225 | 225 | 230 |
| Haze, % | 8 | 7 | 11 | 12 |
| Gloss (45°) | 80 | 75 | 80 | 90 |

Example 3

Coating and Performance Testing

Monolayer films such as those described in section B of Example 1 containing 200 ppm of erucamide slip agent were in-line corona treated to achieve a surface energy of 0.034 to 0.040 μm² prior to coating. Using a standard printing press, these films were coated with the formulations described in Table 2 infra. The polymeric binders employed in the coatings were either Contax™ V OPV acrylate resin (Sun Chemical Corp.; Winston-Salem, N.C.), Adcote™ 33–131 ethylene/vinyl acetate (EVA) copolymer resin (Morton International, Inc.; Chicago, Ill.), or, as a comparative, AYAT™ polyvinyl acetate (PVA) resin (Union Carbide Corp.; Danbury, Conn.). The antifogging agents employed were glyceryl monooleate (Patco Polymer Additives Division of American Ingredients Co.; Kansas City, Mo.), hereinafter GMO, S-MAZ™ 20 sorbitan monolaurate (Sun Chemical Corp.), hereinafter SMO; and (3) Trycol™ 6961 polyethoxylated nonylphenol (Henkel Co.; Ambler, Pa.), hereinafter PNP. Syloid™ W500 silica (W. R. Grace & Co.; Baltimore, Md.) was used as an antiblocking agent in certain films.

Coating formulations were prepared by mixing binder, antifogging agent(s), and additives, followed by dilution with a blend of volatile solvents such as, for example, a 50:50 blend of ethyl acetate and n-propyl acetate.

After the films were coated, the antifog performance of the coatings were evaluated. The films were formed into packages and filled with lettuce using a VFFS machine. Their performances were rated at a variety of times on a scale of 1 to 5 where a rating of 3.5 to 4.0 indicates outstanding resistance to fogging and a rating of 4.0 or higher indicates an excellent resistance to fogging. (This is a well known test published by ICI.)

TABLE 2

| Binder (P) | Antifog agent (A) | Antifog agent (B) | Ratio of P:A:B | Total % of non-volatiles | % silica (s/s) | Performance 4, 24, 48 hrs. |
|---|---|---|---|---|---|---|
| acrylate | GMO | SMO | 3:2:1 | 10 | 0 | 3.75, 4.4 |
| acrylate* | GMO | SMO | 3:2:1 | 15 | 0 | 4, 4.25, 4.75 |
| acrylate | GMO | SMO | 3:2:1 | 15 | 4 | 4, 4.4, 4.4 |
| acrylate | GMO | SMO | 3:2:1 | 15 | 8 | 4.4, 3.75 |
| EVA | GMO | SMO | 3:2:1 | 15 | 0 | 3.75, 3.6, 3.6 |
| acrylate | GMO | SMO | 2:1:0 | 15 | 0 | 3.75, 3.5, 3.75 |
| acrylate | GMO | SMO | 2:0:1 | 15 | 0 | 4.3, 4.5, 4.7 |
| acrylate | PNP | SMO | 2:1:0 | 15 | 0 | 4.3, 4.9, 4.5 |
| PVA | GMO | SMO | 3:2:1 | — | 0 | outstanding |
| none | none | none | N/A | N/A | 0 | 1.3, 2, 1.9 |

*Contained 500 ppm erucamide slip agent

The data Table 2 show that the various coatings, all of which had ratings in the range of "outstanding" to "excellent", outperformed the uncoated control sample. The coated films which did not include any antiblocking agent in the coating were somewhat tacky, with the PVA coating being too tacky to process normally on standard packaging equipment. Those films with silica added to the coating had reduced tackiness and a lessened tendency to block. Overall, the films were difficult to process on VFFS machinery due to the relatively low level of slip agent added to the films during extrusion.

Laminates similar to those described in sections C and D of Example 1 and coextruded multilayer films similar to those described in section A of Example 1 exhibited similar performance and processing characteristics as the films set forth above.

Example 4

Addition of Microspheres

Films such as those tested in Example 3, but incorporating 2000 ppm Zeeosphere™ hollow ceramic microspheres while reducing the amount of erucamide slip agent, were prepared. Four films, containing the following amounts of slip and antiblock additives, were prepared:

| Silica (ppm) | Talc (ppm) | Erucamide (ppm) |
|---|---|---|
| 2400 | 0 | 400 |
| 0 | 3600 | 0 |
| 0 | 3600 | 200 |
| 0 | 3600 | 400 |

These films were coated as in Example 3 with the following antifogging formulation:
- 25 parts by weight (pbw) Contax™ V OPV acrylate
- 4 pbw SMO
- 0.6 pbw Syloid™ W500 silica
- 70.4 pbw of a 50:50 blend of ethyl acetate and n-propyl acetate The films were printed on one side and in-line coated on the other side, using a printing press equipped with an in-line coater. The treatment level on the coat side was adjusted so as to yield a surface energy of approximately 0.036 J/m$^2$. These films were found to have reduced metal-to-film friction during machining of the film on VFFS equipment.

The films then were set aside for three days before being slit. During slitting, the films were monitored for any blocking or transfer (of coating from the applied-to surface to the opposite film surface) on the roll. (Coating transfer generally occurs when blocking is severe.) No transfer of coating was visible with any of the films. The film containing no slip agent showed some blocking but no transfer of coating to the face side.

Example 5

Different Slip Agent

Two films similar to those from Example 4, with the exception that hydroxyerucamide was used as slip agent instead of erucamide, were prepared. (Hydroxyerucamide migrates to film surfaces more slowly than does erucamide.) These films had 2000 ppm microspheres and 3600 ppm silica. One of the films included 200 ppm hydroxyerucamide while the other included 400 ppm.

The films were coated in the same fashion as the films from Example 4. No coating transfer was observed, although a slight amount of blocking was seen with the film containing 200 ppm hydroxyerucamide. This was believed to be due to its relatively low rate of migration to the film surface.

Various modifications and alterations that do not depart from the scope and spirit of this invention will become apparent to those skilled in the art. This invention is not to be unduly limited to the illustrative embodiments set forth herein.

We claim:

1. A packaging film comprising one or more layers, said film comprising:
   a) a heat sealable layer as an outer layer forming an outer surface of the film and comprising a polymer which comprises mer units derived from ethylene;
   b) an antifog blend coated on at least a portion of the outer surface formed by said heat sealable layer, the antifog blend comprising a mixture of at least one antifogging agent disposed in a binder, wherein said binder comprises a polymer comprising mer units derived from at least one of an ester of (meth)acrylic acid and vinyl acetate monomers; and
   c) antiblocking agent dispersed in at least one layer of said film, wherein said film comprises no more than about 800 parts per million slip agent, wherein the surface of said film opposite said coated surface comprises a printed image.

2. The film of claim 1 wherein said surface comprising a printed image is protected with a polymeric overcoating.

3. The film of claim 2 wherein said overcoating comprises silica.

4. The film of claim 1 wherein said slip agent is present in an amount of no more than about 750 parts per million.

5. The film of claim 1 wherein said slip agent is present in an amount of no more than about 500 parts per million.

6. The film of claim 1 wherein said slip agent is present in an amount of no more than about 200 parts per million.

7. The film of claim 1 wherein said antiblocking agent is present in said heat sealable layer.

8. The film of claim 1 wherein said antiblocking agent is present in an amount of between about 0.1 and about 6% by weight, based on the total weight of the film layer in which said antiblocking agent is disposed.

9. The film of claim 1 wherein said antiblocking agent is alkali aluminosilicate ceramic particles.

10. The film of claim 9 wherein said alkali aluminosilicate ceramic particles are present in an amount of between about 0.05 and about 0.75% by weight, based on the total weight of said film.

11. The film of claim 9 wherein said particles have a mean diameter of up to about 5.5 $\mu$m.

12. The film of claim 9 wherein said particles have a refractive index of about 1.52.

13. The film of claim 12 wherein said particles are disposed in a layer of said film having a refractive index of from about 1.50 to about 1.54.

14. The film of claim 1 wherein said binder comprises a polymer comprising mer units derived from an ester of acrylic acid.

15. The film of claim 1 wherein said binder further comprises silica.

16. The film of claim 1 wherein the surface of said film opposite said coated surface is corona treated.

17. The film of claim 1 wherein said surface comprising said printed image is corona treated.

18. A package comprising the film of claim 1.

19. A method of packaging a product comprising:
a) introducing said product into a pouch made from the film of claim 1; and
b) sealing said pouch so as to form a package.

20. The film of claim 1 wherein said binder comprises a polymer comprising mer units derived from an ester of (meth)acrylic acid.

21. The film of claim 1 wherein said binder comprises a polymer comprising mer units derived from vinyl acetate.

22. The film of claim 1 wherein the ratio of said antifogging agent to said polymer of said binder ranges from about 1:10 to about 10:1 by weight.

23. The film of claim 1 wherein the ratio of said antifogging agent to said polymer of said binder ranges from about 2:3 to about 5:1 by weight.

24. The film of claim 1 wherein the ratio of said antifogging agent to said polymer of said binder ranges from about 1:1 to about 2:1 by weight.

25. The film of claim 1 wherein said antifogging agent is selected from esters of aliphatic alcohols, polyethers, polyhydric alcohols, esters of polyhydric aliphatic alcohols, and polyethoxylated aromatic alcohols.

26. The film of claim 1 wherein said antifogging agent is selected from polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly(oxypropylene), polyethoxylated fatty alcohols, polyoxyethylated 4-nonylphenol, polyhydric alcohol, propylene diol, propylene triol, and ethylene diol.

27. The film of claim 1 wherein said antifogging agent is selected from monoglyceride esters of vegetable oil or animal fat, monophenyl polyethoxylate, glycidyl monooleate, and sorbitan monolaurate.

28. The film of claim 1 wherein said antifogging agent comprises sorbitan monolaurate.

29. The film of claim 1 wherein said antifog blend coated on said outer surface of the film has a thickness ranging fror about 0.025 to about 5 $\mu$m.

30. The film of claim 1 wherein said antifog blend coated on said outer surface of the film has a thickness ranging from about 0.1 to about 2.5 $\mu$m.

31. The film of claim 1 wherein said antifog blend coated on said outer surface of the film has a thickness ranging from about 0.25 to about 1 $\mu$m.

32. The film of claim 1 wherein said antifog blend is coated on said outer surface of the film by a coating method selected from flexographic, gravure, and plate.

* * * * *

UNITED STATES PATENT AND TRADEMARK OFFICE
CERTIFICATE OF CORRECTION

PATENT NO. : 6,706,389 B1
DATED : March 16, 2004
INVENTOR(S) : Bates et al.

It is certified that error appears in the above-identified patent and that said Letters Patent is hereby corrected as shown below:

Column 20,
Line 34, "fror" should be -- from --.

Signed and Sealed this

Twenty-fifth Day of January, 2005

JON W. DUDAS
*Director of the United States Patent and Trademark Office*